US010536435B2

(12) United States Patent
Marples et al.

(10) Patent No.: US 10,536,435 B2
(45) Date of Patent: Jan. 14, 2020

(54) SYSTEM AND METHOD FOR AUTHORIZED DIGITAL CONTENT DISTRIBUTION

(71) Applicant: Nytell Software LLC, Wilmington, DE (US)

(72) Inventors: David J. Marples, Notts (GB); John R. Wullert, II, Martinsville, NJ (US)

(73) Assignee: Nytell Software LLC, Wilmington, DE (US)

( * ) Notice: Subject to any disclaimer, the term of this patent is extended or adjusted under 35 U.S.C. 154(b) by 908 days.

(21) Appl. No.: 14/753,385

(22) Filed: Jun. 29, 2015

(65) Prior Publication Data
US 2015/0372990 A1    Dec. 24, 2015

Related U.S. Application Data

(63) Continuation of application No. 11/341,172, filed on Jan. 26, 2006, now Pat. No. 9,077,691.
(Continued)

(51) Int. Cl.
*H04L 9/14*    (2006.01)
*H04L 29/06*    (2006.01)
(Continued)

(52) U.S. Cl.
CPC .......... *H04L 63/0428* (2013.01); *G06F 21/10* (2013.01); *G06F 21/12* (2013.01);
(Continued)

(58) Field of Classification Search
CPC ..... H04L 63/0428; H04L 9/14; H04L 63/061; H04L 2209/24; H04L 2463/101;
(Continued)

(56) References Cited

U.S. PATENT DOCUMENTS 5,708,845 A    1/1998    Wistendahl et al.
5,892,900 A    4/1999    Ginter et al.
(Continued)

FOREIGN PATENT DOCUMENTS

JP    2002-026901 A1    1/2002
JP    2002-175282 A1    6/2002
(Continued)

OTHER PUBLICATIONS

Nishitani, Tomohiro; "Billing for Hybrid Peer to Peer Contents Distribution," The 64th National Convention Record (4) Mar. 12, 2002 to Mar. 14, 2002, pp. 3-445-3-446, Information Processing Society of Japan, Japan, Mar. 12, 2002.
(Continued)

*Primary Examiner* — James D Nigh
(74) *Attorney, Agent, or Firm* — Fitch, Even, Tabin & Flannery LLP (57) ABSTRACT

A digital content distribution system uses a Digital Rights Management Controller that performs a set of arbitrary tests against the transfer request from one user to another such as user A to user B. Assuming these tests are successful, the DRM sends an encryption key to transferring user A. This encryption key E is taken from a table of encryption key/hash pairs which have been provided to the DRM Controller by an external authority such as the content rights holder. User A encrypts the content using they key provided by the DRM controller and then optionally calculates a hash over the encrypted form of the content E(X) and returns this value to the DRM Controller. On checking the returned hash against the hash from the table the DRM controller knows that user A does indeed have the digital content X in good condition. The DRM Controller then instructs both users A and B that the transfer may proceed. The encrypted form of the content E(X) is transferred from A to B. Once the content
(Continued)

transfer has completed B ensures that the received content has been physically written to non-volatile storage (to account for crashes etc. during the next step). B then calculates a hash over the received content and returns this value to the DRM Controller. If this value matches the value previously given then the transfer has been successful and the DRM Controller updates whatever central records are appropriate, while also returning a decrypt key to B to allow it to decrypt the content.

14 Claims, 10 Drawing Sheets

Related U.S. Application Data (60) Provisional application No. 60/647,044, filed on Jan. 26, 2005.

(51) Int. Cl.
*G06F 21/10* (2013.01)
*G06Q 10/10* (2012.01)
*G06Q 30/04* (2012.01)
*G06Q 30/06* (2012.01)
*G06F 21/12* (2013.01)
*G06Q 20/12* (2012.01)

(52) U.S. Cl.
CPC ............. *G06Q 10/10* (2013.01); *G06Q 30/04* (2013.01); *G06Q 30/06* (2013.01); *H04L 9/14* (2013.01); *H04L 63/061* (2013.01); *G06F 2221/2115* (2013.01); *G06Q 20/1235* (2013.01); *G06Q 2220/10* (2013.01); *G06Q 2220/12* (2013.01); *H04L 2209/24* (2013.01); *H04L 2463/101* (2013.01)

(58) Field of Classification Search
CPC .. G06F 21/10; G06F 21/12; G06F 2221/2115; G06Q 10/10; G06Q 30/04; G06Q 30/06; G06Q 20/1235; G06Q 2220/10; G06Q 2220/12
USPC .......................................................... 705/51
See application file for complete search history.

(56) References Cited

U.S. PATENT DOCUMENTS

| | | | |
|---|---|---|---|
| 5,920,861 A | 7/1999 | Hall et al. | |
| 6,000,832 A | 12/1999 | Franklin et al. | |
| 6,112,181 A | 8/2000 | Shear et al. | |
| 6,226,618 B1 | 5/2001 | Downs et al. | |
| 6,263,313 B1 | 7/2001 | Milsted et al. | |
| 6,338,044 B1 | 1/2002 | Cook et al. | |
| 6,363,488 B1 | 3/2002 | Ginter et al. | |
| 6,446,130 B1 | 9/2002 | Grapes | |
| 6,587,836 B1 | 7/2003 | Ahlberg et al. | |
| 6,587,837 B1 | 7/2003 | Spagna et al. | |
| 6,598,167 B2 | 7/2003 | Devine et al. | |
| 6,615,258 B1 | 9/2003 | Barry et al. | |
| 6,636,966 B1 | 10/2003 | Lee et al. | |
| 6,671,803 B1 | 12/2003 | Pasieka | |
| 6,697,811 B2 | 2/2004 | Brodsky | |
| 6,816,721 B1 | 11/2004 | Rudisill | |
| 6,873,258 B2 | 3/2005 | Marples et al. | |
| 6,925,469 B2 | 8/2005 | Headings et al. | |
| 6,944,585 B1 | 9/2005 | Pawson | |
| 6,947,571 B1 | 9/2005 | Rhoads et al. | |
| 6,950,804 B2 | 9/2005 | Strietzel | |
| 7,136,840 B2* | 11/2006 | Pinkas | G06Q 20/3829 705/75 |
| 7,171,692 B1 | 1/2007 | DeMello et al. | |
| 7,200,568 B2 | 4/2007 | Dodd | |
| 7,225,249 B1 | 5/2007 | Barry et al. | |
| 7,281,652 B2 | 10/2007 | Foss | |
| 7,447,736 B2 | 11/2008 | Devine et al. | |
| 7,734,527 B2 | 6/2010 | Uzo | |
| 7,873,534 B2 | 1/2011 | Simons et al. | |
| 9,077,691 B2 | 7/2015 | Marples et al. | |
| 2001/0051996 A1 | 12/2001 | Cooper et al. | |
| 2002/0026575 A1 | 2/2002 | Wheeler et al. | |
| 2002/0129248 A1 | 9/2002 | Wheeler et al. | |
| 2003/0046537 A1 | 3/2003 | Smith | |
| 2003/0084003 A1* | 5/2003 | Pinkas | G06Q 20/3829 705/71 |
| 2003/0097573 A1 | 5/2003 | Wheeler et al. | |
| 2003/0147536 A1* | 8/2003 | Andivahis | H04L 63/06 380/277 |
| 2003/0225709 A1 | 12/2003 | Ukita | |
| 2004/0028031 A1 | 2/2004 | Valin et al. | |
| 2004/0088249 A1 | 5/2004 | Bartter et al. | |
| 2004/0148503 A1 | 7/2004 | Sidman | |
| 2004/0158549 A1 | 8/2004 | Matena et al. | |
| 2005/0010536 A1* | 1/2005 | Cochran | G06F 21/10 705/76 |
| 2005/0033631 A1 | 2/2005 | Wefers et al. | |
| 2005/0192871 A1 | 9/2005 | Galuten et al. | |
| 2006/0173783 A1 | 8/2006 | Marples et al. | |
| 2006/0173784 A1 | 8/2006 | Marples et al. | |
| 2007/0130209 A1 | 6/2007 | Marples et al. | |

FOREIGN PATENT DOCUMENTS

| | | | |
|---|---|---|---|
| JP | 2003-187101 A1 | 7/2003 | |
| JP | 2003-281391 A1 | 10/2003 | |
| JP | 2004-193793 A1 | 7/2004 | |
| JP | 2006-295650 A1 | 10/2006 | |
| WO | 2003/067809 A1 | 8/2003 | |
| WO | WO-03067809 A1 * | 8/2003 | ............. H04L 63/06 |

OTHER PUBLICATIONS

Hosoya, Hiroko et al., "Authentication and Billing in Sharing and Sending Images by P2P Based on Superdistribution," IPSJ SIG Technical Report, No. 121, pp. 39-46, Information Processing Society of Japan, Japan, Nov. 29, 2003.
DRM Specification V2.0, Candidate Version 2.0—Dec. 10, 2004, Open Mobile Alliance, OMA-DRM-V2_0-20041210-C, 145 pages.
Young, Lee W.; Authorized Officer; International Search Report for PCT/US2006/002847 dated Sep. 20, 2007; 4 page.
Young, Lee W.; Authorized Officer; Written Opinion for PCT/US2006/002847 dated Sep. 20, 2007; 4 page.
Seidel, Marianne; Authorized Officer; International Preliminary Report on Patentability for PCT/US2006/002847 dated Jun. 18, 2008; 7 pages.
Extended European Search Report from related European Patent Application No. 06719630.3 dated May 7, 2010; 6 pages.
Official Notice of Rejection from related Japanese Patent Application No. 2007-553246 dated Aug. 24, 2010;13 pages, including English translation.
Chan, Alan; Patent Examiner; Canadian Examiner's Report from related Canadian Patent Application No. 2,628,500 dated Sep. 9, 2010; 2 pages.
Extended European Search Report from related European Patent Application No. 06827578.3 dated Mar. 21, 2011; 5 pages.
Article 94(3) EPC from related European Patent Application No. 06719630.3 dated Jan. 14, 2013; 8 pages.
Article 94(3) EPC from related European Patent Application No. 06827578.3 dated Mar. 26, 2014; 6 pages.

* cited by examiner

Echobelly – car fiction. mp3
Echobelly – car fiction. mp3
Echobelly – car fiction. mp3
Echobelly – car fiction. mp3
Echobelly – car fiction. mp3
Elastica_-_Waking_Up.mp3
Elastica_-_Waking_Up.mp3
Elastica_-_Waking_Up.mp3
Elastica_-_Waking_Up.mp3
Elastica_-_Waking_Up.mp3

510

5BD28847F9A3F7OCCCF170FEBB3EA69589E2F9E985CD783F2D1CDE75411ABE20
45741167CEACF7ADD608B025D3074ADA76DBBD8690AD825837F6178AC533E7A8
6AC2CF0C9456F581E3FBDD49F8F4CBBD585ECCC62C51DAB5FF08DBFD290824DA
7A0FBBD60E9C12EBC8E1DACE187ABE0DBE69E85786E92EB03BFD00D78638DC01
21ACAB4509268E59CF54A9571C5253DC92A926B5233533485616CFAC1DE8DBA3
8610FF56BCCC563AF255D91F04COA333172A1A40C087B29D2B8FF875F38C1ABB
CA004D13201E92F91D32F45105D8FDCBE8F20B552ECD9761C5037C617A993EC
80B1132F56E736EE687OEF58AAC436C1F5AF18613393FD4E1AD59DB013A00AB9
34F2629700B78A565AA9923CED0BF64A825A6E7650D40A2CE94CB84D970DDB9
E34F8B0B9F66BE491F79F0F158D6066E23DD71EA0819078EEA629OBC167ED2D2

520

0564BC17597456C8A58F0703E488096B
C81266078470C11274EFAA2BE635516B
14CB224EA65E1C9EEC6C6F6718F7E00A
DB2C99F323E984OCOB483DC141D32AEE
B5775BA6D87D1A9EOF6FA3D3C9ODC599
A6046CBBB78B332FB59551BF1906A7DOD
887309486E763F46B22AODFCF17BE314
CEE8D9AAFC5F98C5934F057E3E6FA3C1
2A9E5B251DOFD8208203A9B37EA94822
00E50198D1090BC4EF1789346366D69

Digital Rights Management Self-Service Site

Telcordia™ Technologies

Welcome back,
8456997374 (tom)

My Account Balance

My Billing Activity

My Media

Top-Up

Click here to Logout. Or you may update your account.

Media Registrations Info

You have registered the following resources:

| Media | Origin | Cost | Date |
|---|---|---|---|
| Echobelly_-_car_fiction.mp3 | 8456997300 | $1.10 | 01/01/04 |
| Elastica_-_Waking_Up.mp3 | 8456997300 | $2.10 | 01/03/01 |
| R.E.M._-_Pop_Song_89.mp3 | 8456997300 | $2.10 | 01/03/01 |
| Rush_-_The_big_money.mp3 | 8456997300 | $2.10 | 01/03/01 |
| The_Divine_Comedy_ _Songs_Of_Love.mp3 | 8456997300 | $2.10 | 01/03/01 |
| The_Smiths_-_ _This_Charming_Man.mp3 | 8456997300 | $2.10 | 01/03/01 |
| x.mp3 | 8456999081 | $2.10 | 01/03/01 |
| y.mp3 | 8456998711 | $2.10 | 01/03/01 |
| z.mp3 | 8456992231 | $2.10 | 01/03/01 |

SYSTEM AND METHOD FOR AUTHORIZED DIGITAL CONTENT DISTRIBUTION

CROSS-REFERENCE TO RELATED APPLICATIONS

This application is a continuation of U.S. application Ser. No. 11/341,172, filed Jan. 26, 2006, now issued as U.S. Pat. No. 9,077,691, which claims the benefit of U.S. Prov. Appl. No. 60/647,044, filed Jan. 26, 2005, which are both incorporated by reference herein in their entirety.

FIELD OF THE INVENTION

The present invention relates generally to the field of digital content distribution in a telecommunications network and, more specifically, to payment mechanisms for the authorized legal distribution of digital content within a peer-to-peer (P2P) environment.

BACKGROUND

Peer-to-peer P2P networks are networks that enable a computer user in possession of digital content to share the digital content with other users without having to transfer to or download the content from a central server. P2P networks have generally been very successful but have existed outside of most legal frameworks. This has led to considerable controversy including the shutdown of many peer-to-peer networks due to court injunctions and other legal problems. This problem appears to have been solved in conjunction with the Digital Rights Management (DRM) issue but separating DRM and Digital Content Distribution (DCD) has led to innovative differentiation. Even then this has not really been solved in a generic P2P infrastructure, but has resulted in much more centralized environments.

Current P2P solutions have been created outside of a legal framework and are subject to repeated attack from copyright holders. Their growth is limited by ongoing legality concerns in the minds of potential users which are fostered by the RIAA and like organizations.

Current DRM solutions tend to have originated with rights holders and thus tend to enforce additional restrictions on the use of purchased materials above and beyond those which consumers have come to expect with videocassette recorders (VCRs) and the Compact Cassette. This has lead to consumer resentment. DRM solutions also tend to be somewhat centralized in nature leading to limited, or very expensive systems.

P2P operators have not, historically, been too concerned with content tracking and tracability, nor with the implementation of a legal overlay on a P2P infrastructure. Traditional DRM providers view their value as being in the DRM solution, not in the content distribution component, for which they would typically expect to use commercially available solutions.

Thus, there is a need for a peer-to-peer (P2P) distribution scheme that can incorporate the concepts from digital rights management thereby enabling the distribution of digital content such as music, movies and books while providing just compensation to the owners of such copyrighted works.

It would be desirable to have a P2P digital content distribution system and method that enable charging back to a prepaid account such as a prepaid mobile phone account.

Additionally, it would be desirable to have a P2P digital content distribution system that provides for certification of quality of content thereby ensuring that the downloaded digital files are not corrupted or contain viruses or other problems that would prohibit their legitimate use.

Furthermore, it would be desirable to have a P2P digital content distribution system that provides credits to a customer for the onward distribution of digital content to additional users/customers.

SUMMARY

The present invention enables the legitimate P2P distribution of digital content within a legal framework in which operators do not need to have first hand knowledge or possession of the content thereby enabling operators to claim the equivalent of 'common carrier' status in a content environment. Two sharing users, A and B, previously registered with a DRM controller, find by some arbitrary method that they wish to exchange a piece of digital content, X. B requests a copy of digital content X from A, which A is willing to provide and so A sends an acknowledgement back to B. Both A and B register their interest in the content element X with the DRM Controller. Note that in the general case there may be more than one sender (i.e. equivalent to A) for a given request.

The DRM Controller performs a set of arbitrary tests against the transfer request (e.g. does B have sufficient funds, does A officially and legally have possession of X, is it within a window of time in which A is allowed to distribute content etc. etc.) and, assuming these tests are successful, it sends an encryption key E to A. This encryption key E is taken from a table of encryption key/hash pairs which have been provided to the DRM Controller by an external authority such as the copyright owner of digital content X or the party that controls digital distribution of digital content X.

User A encrypts the content using the key provided by the DRM controller and then calculates a hash over the encrypted form of the content E(X) returning this value to the DRM Controller. Because the encryption key, E, is not known ahead of time, user A cannot know the value of the hash a priori and can only calculate it by performing the Encryption/Hash Calculation steps. On checking the returned hash against the hash from the table, the DRM controller knows that User A does indeed have the content element X and it is in good condition (i.e, it has not been altered from the form used to create the key/has pair). The DRM Controller then instructs both A and B that the transfer may proceed.

The encrypted form of the content E(X) is transferred from user A to user B by arbitrary means that are well known in the art. Once the content transfer has completed, B ensures that the received content has been physically written to non-volatile storage (to account for crashes etc. during the next step). B then calculates a hash over the received content and returns this value to the DRM Controller. If this value matches the value previously given then the transfer has been successful and the DRM Controller updates whatever central records are appropriate, while also returning a decrypt key to B to allow it to decrypt the content. A record of the transfer is kept for a period of time such that if B crashed in the period from obtaining the complete content to receiving the decrypt key and decrypting the content then B could request said key again without incurring additional charges.

It will be noted that the DRM Controller never needed to 'see' the content. It only requires a set of encrypt key/hash pairs. If these pairs are generated by an external responsible authority then the organization running the DRM Controller need never see or have knowledge of what the content element is. Note that in an extension to the invention if the key/hash pairs are consumed this would serve as a form of audit and tracking for the content rights holder and would also prevent possible attacks based in the re-use of key/hash pairs In this manner the DRM Controller can certify transfers without ever needing to have access to the content concerned. The content owner can provide keys and signatures. Because back end systems decide if a transfer should, or should not progress, neither sender or receiver can individually circumvent the system

DETAILED DESCRIPTION OF THE DRAWINGS

Figure 1:
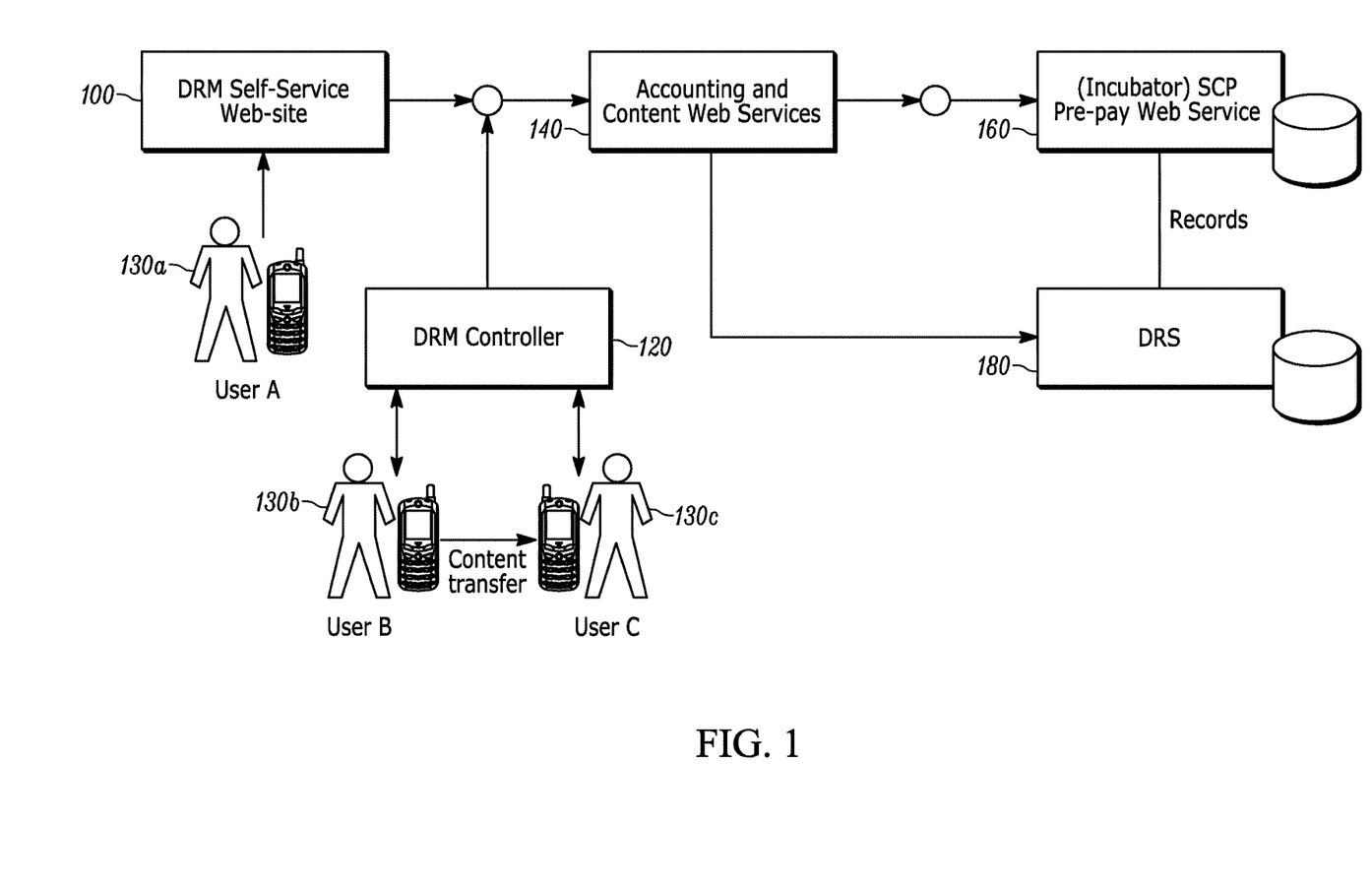
FIG. 1 depicts the architecture of one embodiment of a digital content distribution system in accordance with the present invention.

In FIG. 1 the architecture of a digital content distribution system in accordance with the present invention is shown. User A communicates with a DRM Self-Service Web-Site 100 using a device 130a for the purpose of inputting various information regarding the distribution of content owned or controlled by User A. Device 130a may be any type of general purpose personal computer (PC), personal digital assistant (PDA), mobile handset, cellular telephone or other handheld device capable of communicating in a wired or wireless manner with the Internet so as to display one or more user input screen such as those discusses below in relation to FIG. 6. Device 130a would need software such as an Internet browser, Wireless Access Protocol (WAP) browser or other similar software in order to send and receive data from the DRM Self-Service Web-Site 100. This type of software is well-known in the art.

User A communicates using device 130a with DRM Self-Service Web-Site 100 in order to specify various parameters with respect to the transfer of content between one or more other users such as User B and User C. FIG. 1 shows the arrangement of components within a typical operational digital content distribution system. In this example, transfer of digital content owned or controlled by User A is transferred between User B and User C using the associated DRM Controller 120. The other components are important for the construction of a physical system but are not as important to the present invention as DRM Controller 120.

DRM Controller 120 communicated with DRM Self-Service Web-Site 100 in order to receive information regarding how to handle a transfer of digital content from one user to another, such as the transfer of digital content from User B to User C. User B and User C communicate with DRM Controller 120 and with each other by using devices 130b and 130c which devices are similarly enabled to device 130a described above, although devices 130b and 130c should contain an interface for use by an actual person. A typical transaction would begin with some type of dialog between User B and User C that leads the two to decide that one has content that it would like to share with the other.

Accounting and Content Web (ACW) Server 140 comprises software implemented on a general purpose computer that is capable of keeping track of transfer of digital content and payment of digital content. ACW Server 140 is in communication with DRM Self-Service Web-Site 100 in order to receive information about the amount of compensation a user such as User A desires to receive for transfers of digital content between other user such as User B and User C. ACW Server 140 is also in communication with SCP Pre-Pay Web Service Server 160 that is an intelligent service control point capable of decrementing an account of the user paying for a transfer of content and incrementing one or more of the accounts of the user transferring content and/or the owner of the content being transferred. In this way, P2P transfers of digital content can be accomplished with the knowledge and approval of the owner of the content who is properly compensated for the transfer. SCP Pre-Pay Web Service Server 160 is in communication with the Digital Rights Server (DRS) which is a repository of records associated with the transfer of digital content and payment for such transfers. SCP Pre-Pay Web Service Server 160 can be any of several known intelligent service control points such as the Telcordia Converged Application Server and/or Real-Time Charging System.

Figure 2:
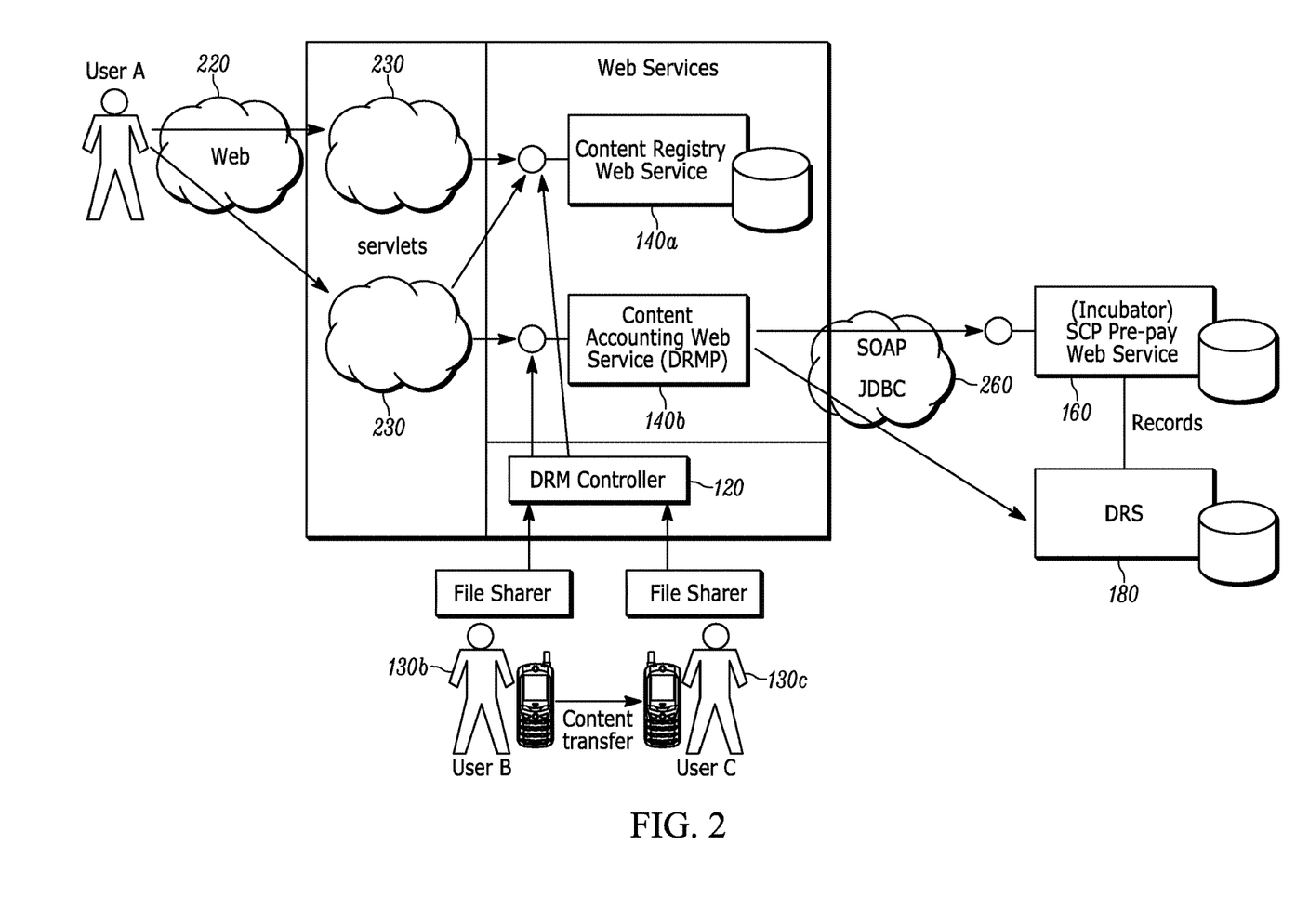
FIG. 2 depicts the architecture of another embodiment of a digital content distribution system in accordance with the present invention.

FIG. 2 depicts a more detailed embodiment of a digital content distribution system, in accordance with the present invention. Again User A communicates using a device (not shown) through the Internet 220 with one or more DRM Self Service servers/servlets 230 in order to input various information about the distribution of digital content owned or controlled by User A. ACW Server 140 is broken into two components: Content Registry Web Server 140a and Content Account Web Server (Digital Rights Management Platform) ("DRMP") 140b. Content Registry Web Server 140a manages the information that plays a role in allowing content to be forwarded between users. That is, it contains user or content-owner "preferences" pertaining to allowing content exchange such as exchange rights spelled out in traditional DRM systems. Content Accounting Web Service 140b keeps track of the amount a user desires for transfer of specific digital content and communicated through the Internet 220 using a Simple Object Access Protocol (SOAP) 260 with ISCP pre-pay web-services 160 to enable the account of the users and owners of content to properly decremented and incremented in accordance with the payment scheme. Content Accounting Web-Service 140b can also communicate using Java Data Base Connectivity (JDBC) with DRS 180 in order to directly access records of users of the digital content distribution system.

As with FIG. 1, User B and User C get permission for a transfer of digital content by communicating with DRM Controller 120. DRM Controller 120 communicated with Content Accounting Web Service 140b and Content Registry Web Server 140a. In the case of the former, DRM Controller 120 sends information about the transfer so as to enable proper incrementing and decrementing of user accounts. For example, a transfer of digital content from User B to User C could result in a decrementing of the account of User C as well as an incrementing of the accounts of User A and User B. User A, as the owner of the digital content, is likely to receive the majority of the payment made by User C but User B might also receive a small payment as a reward for being the one distributing content on behalf of User/Owner A.

Figure 3:
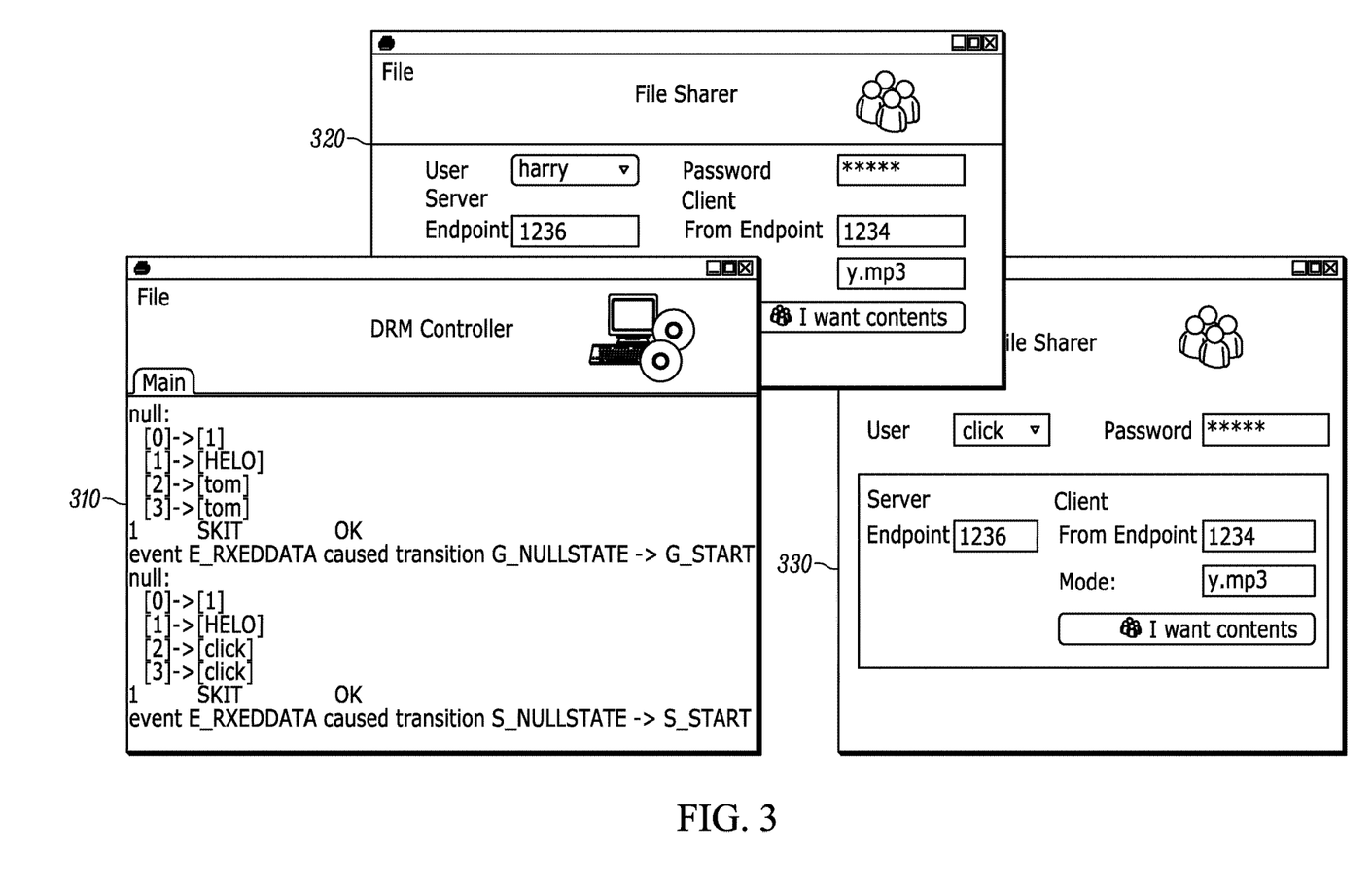
FIG. 3 depicts the graphical user interface for use of users of the file sharing process of a digital content distribution system in accordance with the present invention.

FIG. 3 depicts a few of the graphical user interface (GUI) screens shown by the DRM Controller 120 to users of the system. Interface Screen 310 is the P2P transfer control screen. Interface screen 320 is the interface seen by the receiving peer or user such as User C in the example transaction in FIGS. 1 and 2. Interface Screen 330 is the interface seen by the sending peer/user such as User B.

Figure 4:
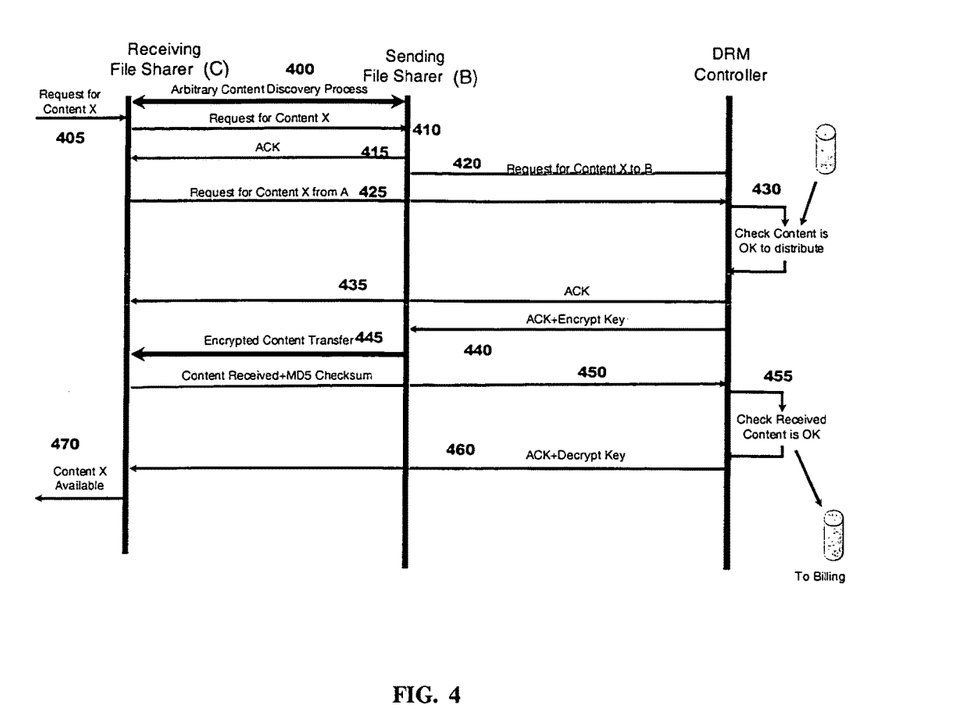
FIG. 4 depicts the process flow of the file sharing process in a digital content distribution system in accordance with the present invention.

The flow of content transfer process between User B and User C is shown in FIG. 4. User B and User C have previously registered with DRM controller 120 and have by some arbitrary method decided that they wish to exchange a piece of digital content, X at step 400 of FIG. 4. User C requests a copy of digital content X from User B at step 405/410. User B is willing to accept the request and so sends an acknowledgement back to User C at step 415. Both User B and User C register their interest in the digital content X with the DRM Controller 120 at steps 420 and 425 respectively. Note that in the general case there may be more than one sender (i.e. equivalent to A) for a given reception. Digital content X may be any type of digital information including but not limited to digital music, movies, books, magazines, computer software, audiobooks, etc.

At step 430 the DRM Controller 120 performs a set of arbitrary tests against the transfer request. For example the DRM Controller 120 may be designed to query whether User C has sufficient funds. Alternatively, DRM Controller may query whether User B legitimately has a copy of digital content X, or whether it is a time period in which User A is allowed to distribute content. Any number of arbitrary tests can be generated. Assuming these tests are successful, DRM Controller 120 sends an acknowledge (ACK) message back to User C at step 435 and/or an acknowledge (ACK) message with an encryption key E to User B at step 440. This encryption key E is taken from a table of encryption key/hash pairs which have been provided to the DRM Controller by an external authority. For example, the encryption key/hash pairs may be provided by User A, the owner or licensed distributor of digital content X.

User B encrypts the content using they key provided by the DRM Controller 120. User B also performs a hash function (preferably MD5) over the encrypted digital content and returns this hash to the DRM Controller 120 at an optional step not shown in FIG. 4. If the hash matches that in the database of the DRM Controller then the DRM Controller instructs User A and User B that the transfer may proceed at an additional optional step not depicted in FIG. 4. User B then transfers the encrypted content to User C by arbitrary means that are well known in the art at step 445.

Once the content transfer has completed User C ensures that the received content has been physically written to non-volatile storage (to account for crashes) in a step not shown in FIG. 4. User C then calculates a hash over the encrypted form of the content E(X) and returns this hash value to the DRM Controller 120 at step 450. Because the encryption key E is not known ahead of time, User C cannot know the value of the hash a priori and can only calculate it by performing the Encryption/Hash Calculation steps. On checking the returned hash value against the hash from the table the DRM Controller 120 knows that User C does indeed have the digital content X and that the digital content is in good condition. If this value matches the value provided by the content owner User A and stored by the DRM Controller then a transfer of valid content has been successful and the DRM Controller updates whatever central records are appropriate at step 455, while also returning an acknowledge (ACK) message with a decrypt key to User C to allow User C to decrypt the digital content X. A record of the transfer is kept for a period of time such that if User C crashed in the period from obtaining the complete content to receiving the decrypt key and decrypting the content then they could request said key again without incurring additional charges.

It will be noted that the DRM Controller 120 never needed to 'see' or possess an actual copy of the digital content. DRM Controller 120 only requires a set of encrypt key/hash pairs. If these pairs are generated by an external responsible authority then the organization running the DRM Controller need never see or have knowledge of what the digital content X is.

In an extension to the invention if the key/hash pairs are consumed this would serve as a form of audit and tracking for the content rights holder and would also prevent possible attacks based in the re-use of key/hash pairs. By "consumed" it is meant that the DRM server would use a key/hash pair for one and only one transaction and would never re-use the transactions for subsequent transactions. Furthermore, the external repository could supply the key/hash pairs to the DRM server on demand, when users have committed to a content transfer.

Figure 5:
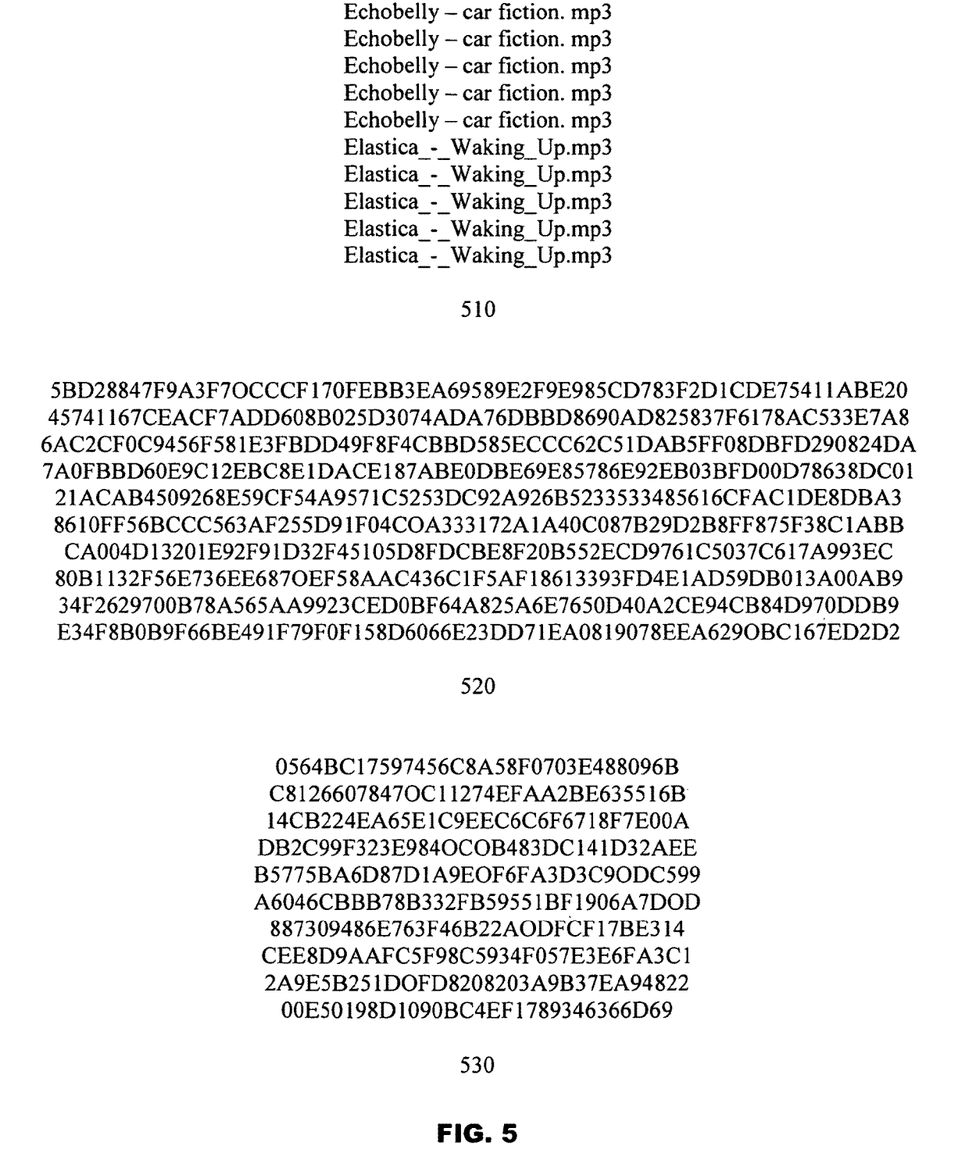
FIG. 5 depicts an example of the content shared in a digital content distribution system in accordance with the present invention; and, FIGS. 6A-E depict the graphical user interface screens forming the interface to the DRM self-service web-site in a digital content distribution system in accordance with the present invention.

FIG. 5 depicts an example of digital content that is being transferred from one user to another. Field 510 contains the filenames of the digital content to be transferred. In this example the digital content is MP3 encoded music files. Field 520 contains the encrypt and/or decrypt keys and field 530 contains the related MD5 checksum hash. One line from the file set forth in FIG. 5 is all that is needed for the DRM Controller 120 to be able to validate a specific transfer.

Figure 6A:
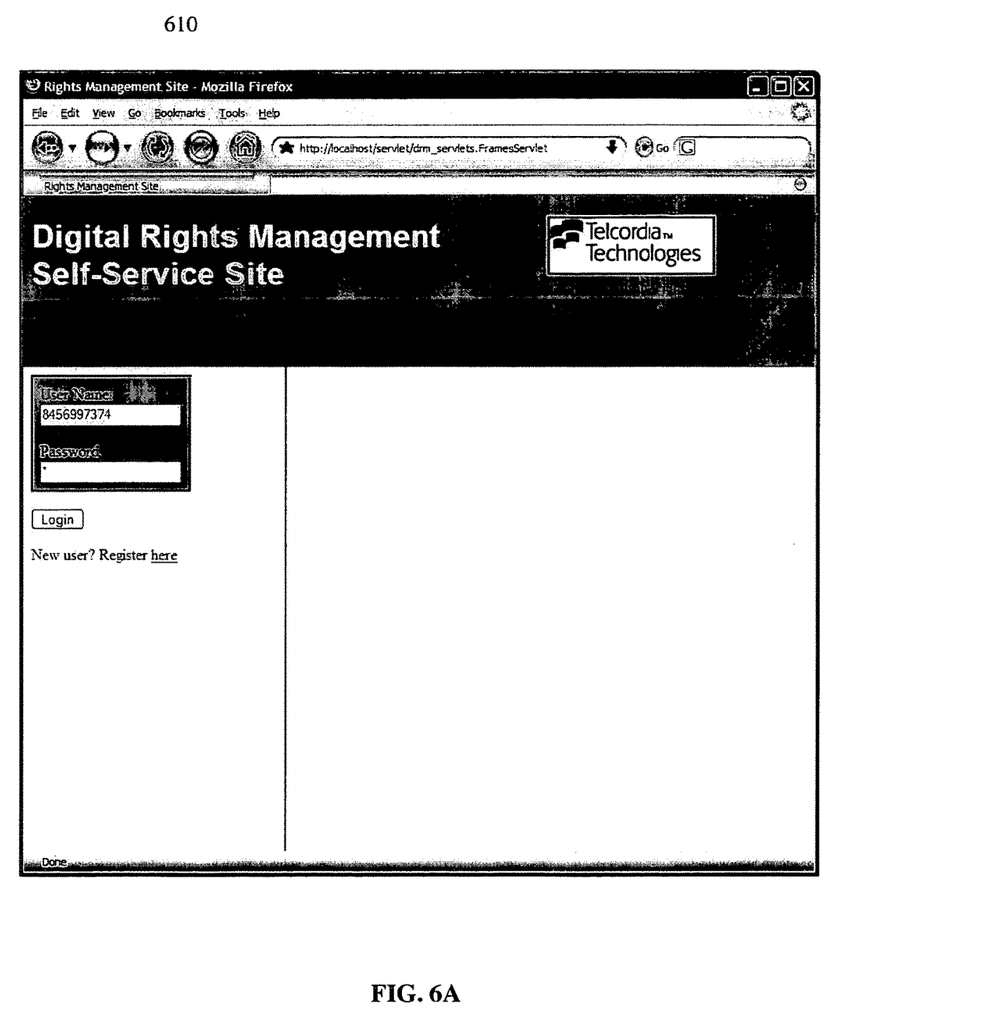
Figure 6B:
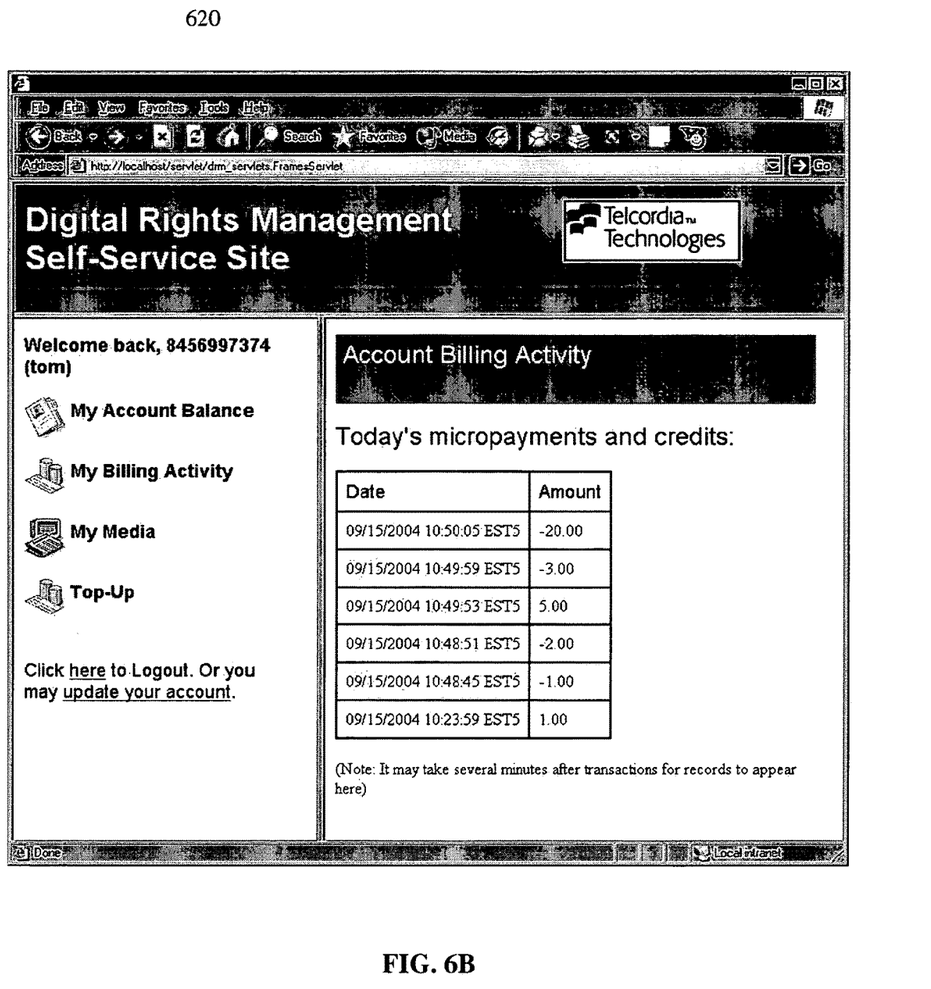
Figure 6C:
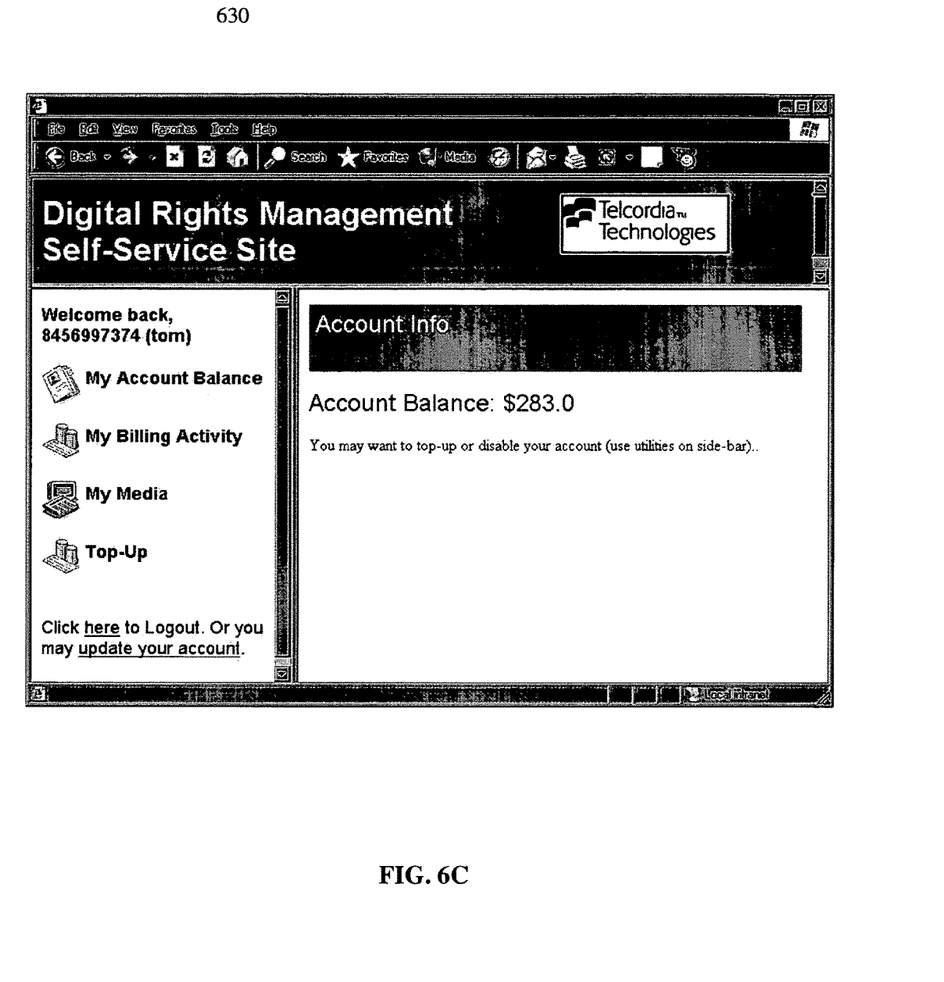
Figure 6D:
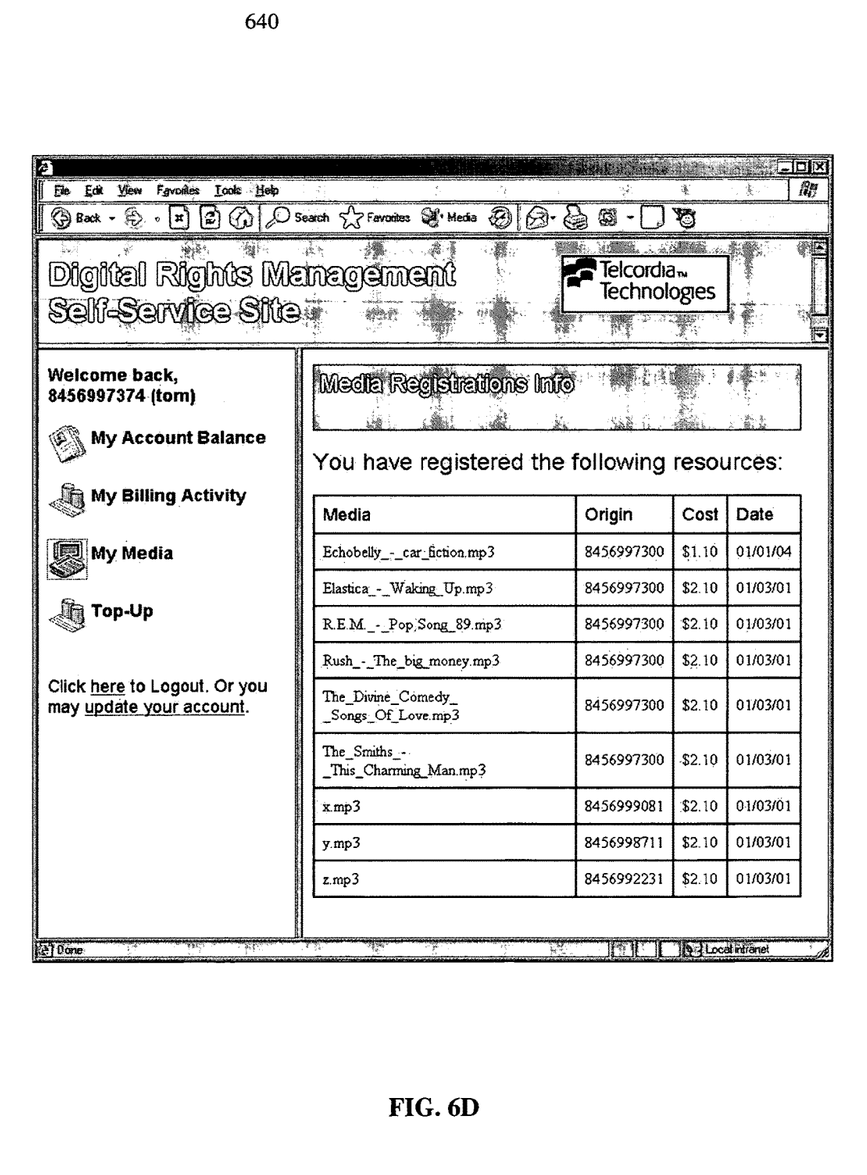
Figure 6E:
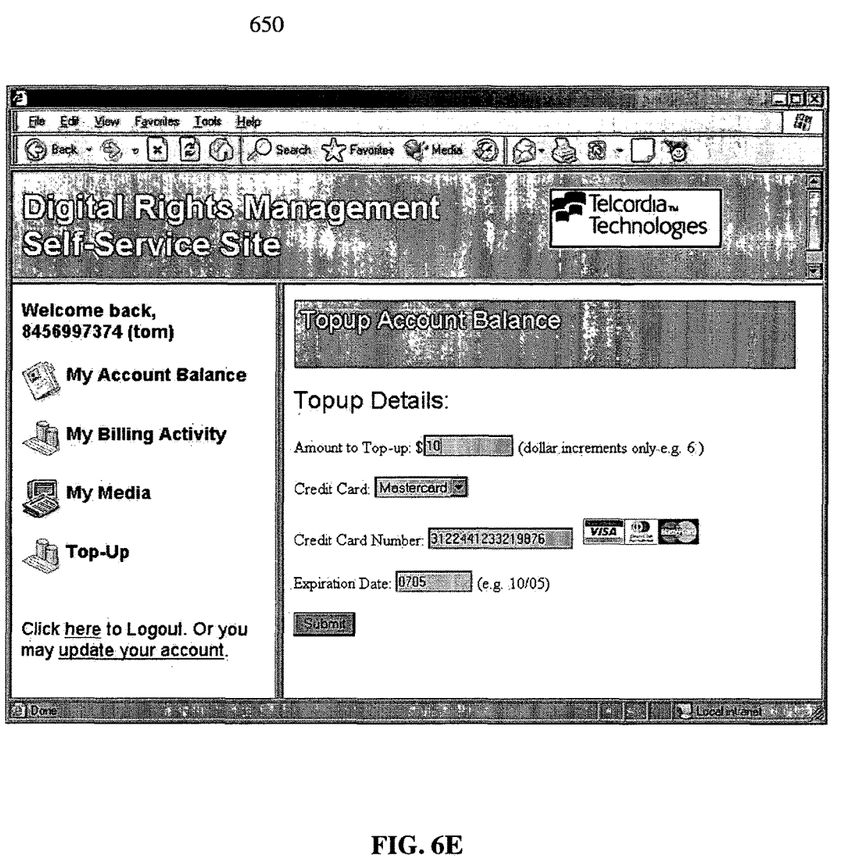

FIGS. 6A-E depict a set of graphical user interface (GUI) screens used by the DRM Self-Service Web Server 100 in order to gather information from the owner of digital content. Screen 610 of FIG. 6A is a user login screen for such a server. Screen 620 of FIG. 6B provides the owner/user with the ability to select the viewing of account balances, billing activity, media, and to "top-up" a pre-pay account balance. Screen 630 of FIG. 6C provides information on the account balance. Screen 640 of FIG. 6D enables the user to view the digital content that he or she has transferred from another source. Screen 650 of FIG. 6E provides an interface for adding money to a pre-pay wallet for the future purchase of digital content.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

What is claimed is:

1. A method for authorized distribution of digital content from a first user to a second user in communication with a digital rights management (DRM) controller computing device wherein the DRM controller computing device does not possess a copy of the digital content and does possess a key/hash pair provided by a third party associated with the digital content in a key/hash database, the method comprising the steps of:

receiving at the DRM controller computing device a request from a first computing device to transfer the digital content to a second computing device;

sending an encryption key from the DRM controller computing device to the first computing device, which is usable to encrypt the digital content at the first computing device;

receiving a hash of encrypted digital content at the DRM controller computing device from the second computing device after the encrypted digital content has been transferred from the first computing device to the second computing device;

determining at the DRM controller computing device if the result of the hash is correct for the digital content by comparing the key/hash pair provided by the third party associated with the digital content in the key/hash database to the hash received from the second computing device; and     if the hash received from the second computing device corresponds to the key/hash pair associated with the digital content in the key/hash database, sending a decryption key to the second computing device from the DRM controller computing device that is usable to decrypt the digital content at the second computing device.

2. The method of claim 1 further comprising the steps of:

performing the hash at the first computing device after the step of encrypting and sending the hash to the DRM controller computing device;

comparing the hash sent by the first computing device at the DRM Controller computing device with the key/hash pair provided by the third party associated with the digital content in the key/hash database; and     authorizing transfer of the encrypted digital content from the first computing device to the second computing device, upon confirmation that the hash received from the first computing device corresponds to the key/hash pair associated with the digital content in the key/hash database.

3. The method of claim 1 further comprising the steps of:

determining at the DRM controller computing device whether the transfer of digital content is authorized by performing one or more arbitrary tests.

4. The method of claim 3 wherein the arbitrary test determines whether the first user possesses a legitimate copy of the digital content and the method further comprising receiving a hashed version of the encrypted digital content at the DRM controller computing device from the first computing device and comparing the received hashed version of the encrypted digital content with the key/hash pair associated with the digital content in the key/hash database.

5. The method of claim 3 wherein the arbitrary test determines whether the second computing device has an account with sufficient funds to compensate an owner of the digital content.

6. The method of claim 1 wherein the key/hash pair is used only for the transfer of the digital content from the first computing device to the second computing device and is not used for any other transfer and wherein the method further comprises receiving at the DRM controller computing device the key/hash pair for the digital content from a third computing device and storing the key/hash pair received from the third computing device in the key/hash database.

7. The method of claim 1 further comprising the step of determining that the first computing device possesses digital content that the second computing device desires to have without using the DRM controller computing device to make such a determination.

8. The method of claim 1 further comprising the step of sending a request from the first computing device and/or the second computing device to the DRM controller computing device for a transfer of the digital content from the first computing device to the second computing device.

9. The method of claim 3 further comprising the step of sending an acknowledgement from the DRM controller computing device to the first computing device and/or the second computing device that the transfer is authorized.

10. The method of claim 1 further comprising the step of storing a record of the transfer of the digital content from the first computing device to the second computing device without storing a copy of the digital content at the DRM controller computing device.

11. The method of claim 10 wherein the step of storing a record is accomplished using an accounting and content web server.

12. The method of claim 11 wherein an account of the owner of the digital content is incremented upon transfer of the digital content from the first computing device to the second computing device.

13. The method of claim 11 wherein an account of the first computing device is incremented upon transfer of the digital content from the first computing device to the second computing device.

14. The method of claim 11 wherein an account of the second computing device is decremented upon transfer of the digital content from the first computing device to the second computing device.

\* \* \* \* \*